United States Patent

[11] 3,594,927

| [72] | Inventor | Masami Koizumi<br>Kawasaki-shi, Japan |
|---|---|---|
| [21] | Appl. No. | 829,922 |
| [22] | Filed | June 3, 1969 |
| [45] | Patented | July 27, 1971 |
| [73] | Assignee | Kabushiki Kaisha Ricoh<br>Tokyo, Japan |
| [32] | Priority | June 4, 1968, June 20, 1968 |
| [33] | | Japan |
| [31] | | 43/38227 and 43/42834 |

[54] QUESTIONEE'S RESPONSE-DETECTING DEVICE
1 Claim, 5 Drawing Figs.

[52] U.S. Cl. ............... 35/48, 307/146
[51] Int. Cl. ............... G09b 7/02
[50] Field of Search ............... 35/48, 9, 9.1, 8; 307/114, 146; 320/26

[56] References Cited
UNITED STATES PATENTS
2,997,607  8/1961  Hill............................... 307/146
3,255,536  6/1966  Livingston....................... 35/9

FOREIGN PATENTS
61,137  4/1968  Germany......................... 35/9

Primary Examiner—Robert W. Michell
Assistant Examiner—J. H. Wolff
Attorney—Burgess, Ryan and Hicks ABSTRACT: There is provided a questionee's response-detecting device comprising a plurality of questionee's answer selection switches, response indicating and/or recording means, a DC power source and a questioner's changeover switch interconnected between the power source and said questionee's answer selection switches, thereby indicating and/or recording the response of questionee's (Yes, No and No Answer) by the combinations of the questioner's changeover switch and the questionee's answer selection switches. If required, an audio communication system may be incorporated. The response indication and/or recording may be immediately and accurately made.

INVENTOR

MASAMI KOIZUMI

BY Burgess, Ryan & Hicks
ATTORNEYS

QUESTIONEE'S RESPONSE-DETECTING DEVICE

BACKGROUND OF THE INVENTION

The present invention relates to a questionee's response-detecting device and more particularly a questionee's response-detecting device for selectively indicating and/or recording questionee's response.

When it is desired to simultaneously indicate all of the questionees' responses to one question, a device as shown in FIG. 1 has been used. Lamps $L_{11}$, $L_{12}$, $L_{13}$...are provided for respective questionees and are connected to a DC or AC power source through switches $S_{11}$, $S_{12}$, $S_{13}$....Each questionee closed his switch so as to turn on his lamp, thereby indicating his response "YES" or "NO." In this case, the questionee is only allowed to choose between the two, "YES" or "NO." Therefore, the correct indication and/or recording of the response can not be made when some of the questionees want to give "no answer." Furthermore, the response indication and/or recording must be made twice in order to indicate and/or record both of the answers "YES" and "NO." Thus, the conventional device of the type described presents serious problems in enabling to see all of the responses simultaneously and immediately and in making simple the construction of the recording device.

In view of the above, one object of the present invention is to provide a questionee's response-detecting device of simplified electrical construction which can readily detect the questionees' response as "YES" or "NO" or even "no answer."

SUMMARY OF THE INVENTION

In brief, the questionee's response-detecting device according to the present invention comprises a plurality of questionee's answer selection switches, indicating and/or recording means, a DC power source and a questioner's changeover switch interconnected between said DC power source and said questionee's answer selection switches.

According to one embodiment of the present invention, two answer selection circuits are provided for each questionee's answer selection switch, and each switch is connectable in series with rectifier elements with opposite polarity, respectively. When a questionee depresses a selection pushbutton (not shown, but a conventional means of controlling movement of his switch) in answer to one question, and the questioner switches his switch to one position, indicating means and/or recording means are actuated when they are connected to a rectifier element which is connected to the DC power source in the forward direction and is selected by said pushbutton depression so as to establish a closed circuit, thereby indicating and/or recording the questionee's response. Thereafter, when the questioner changes his switch to another position, a different response will be indicated and/or recorded. The number of nonindication and/or nonrecording responses is that of those who give "no answer."

If it is only desired to indicate the questionee's response "Yes," "NO" or "no answer," the construction would become simpler by connecting indicator means each indicating "YES," "NO" or "no answer" without using the above rectifier elements. However, it is not preferable to provide one recording means for each of the response, "YES," "NO" and "no answer" that is, one recording means must record all of the response. In the device according to the present invention, it is required that no current flows in the questionees' answer selection switches when they select for example "NO," while the current should flow through other questionees' answer selection switches when they select "YES" so that the questioner may detect the number of those who answered "YES." The rectifier elements incorporated in the device of the present invention play an important role for this purpose.

Since the rectifier elements are used in the questionees' answer selection switches, the changeover switch operated by the questioner must change the polarity of the rectifier elements, that is select the direction of flow of current through the questionees' answer selection switches.

According to one embodiment of the present invention, in the two answer selection circuits to be closed by pushbuttons, respectively, there are connected rectifiers, respectively, which pass current in opposite directions.

According to another embodiment of the present invention, instead of the above, two diodes of a symmetrical-type diode is used.

In still another embodiment of the present invention, one diode and a two-way switch are used so that the number of diodes used may be reduced.

According to a further embodiment of the present invention, the questionee's response-detecting device is combined with an audio communication system so that communication between the questioner and the questionees may be established. Since the communication system utilizes the circuit of the response-detecting device, the overall circuitry can be made simple.

The above and other objects, features and advantages of the present invention will become more apparent from the following description taken in conjunction with the accompanying drawings.

DESCRIPTION OF THE PREFERRED EMBODIMENT

Figure 1:
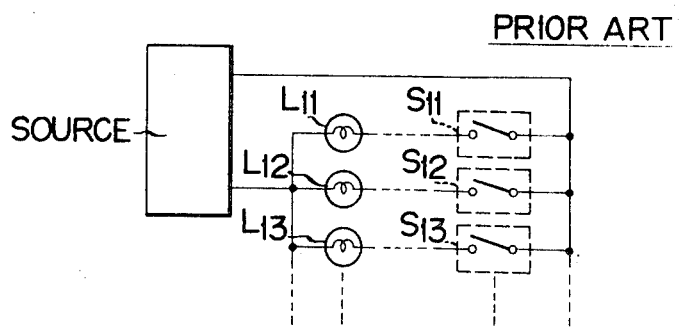
FIG. 1 is a circuit showing one conventional questionee's response-detecting device.
Figure 2:
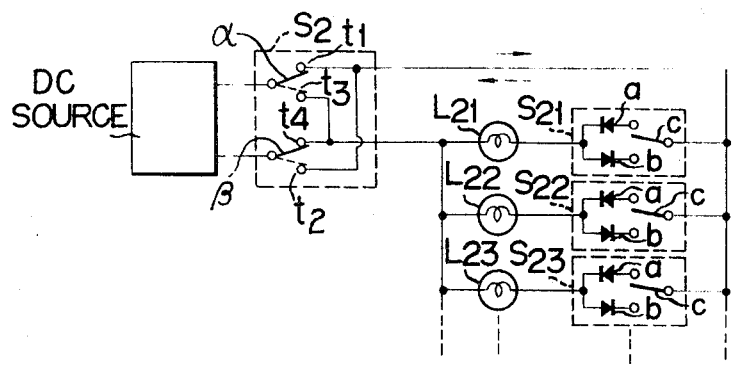
FIG. 2 is a circuit of one embodiment of the present invention.

Referring to FIG. 2, lamps $L_{21}$, $L_{22}$, $L_{23}$,...are provided for respective questionees. Questionee's switch circuits (to be referred to as "response switches" hereinafter for brevity) $S_{21}$, $S_{22}$, $S_{23}$,...and a questioner's switch $S_2$ for changing over the polarities are connected in series to a DC power source. Each of the response switches $S_{21}$, $S_{22}$, $S_{23}$,—is comprised of a pair of parallel connected rectifier elements $a$ and $b$ with opposite polarities and a switch $c$ for selectively switching from one polarity to the other. The polarity changeover switch $S_2$ is comprised of four terminals or stationary contacts $t_1$, $t_2$, $t_3$ and $t_4$ and a pair of movable contacts $\alpha$ and $\beta$ for selectively contacting with $t_1$ and $t_4$ or $t_2$ and $t_3$. The movable contacts $\alpha$ and $\beta$ are connected to the opposite polarities of the power source respectively. The terminals $t_1$ and $t_2$ are connected to the switches $c$ of the response switches $S_{21}$, $S_{22}$, $S_{23}$,...and the terminals $t_3$ and $t_4$, to the lamps $L_{21}$, $L_{22}$, $L_{23}$,....When the switch or movable contact $\alpha$ is connected to the positive terminal or polarity of the power source while the movable contact $\beta$ is connected to the negative terminal or polarity, and when the movable contacts $\alpha$ and $\beta$ are switched to the terminals $t_1$ and $t_4$ respectively while the switches $c$ are switched over to the rectifier elements $a$ respectively as shown in FIG. 2, the current flows in the direction indicated by the solid line arrow so that the lamps $L_{21}$, $L_{22}$, $L_{23}$,...are turned on or lighted. In this state, when the switches $c$ are switched over to the rectifier elements $b$, whose direction is opposite to that of the rectifier elements $a$, no current flows so that no lamps $L_{21}$, $L_{22}$, $L_{23}$,...are turned on. Next when the switches $c$ are switched over to the rectifier elements $b$ while the movable contacts $\alpha$ and $\beta$ are switched over to the terminals $t_2$ and $t_3$ respectively, the current flows in the direction indicated by the broken line arrow so that the lamps $L_{21}$, $L_{22}$, $L_{23}$,...are turned on.

Each of the questionees operates his switch $c$ to select either the rectifier element $a$ or $b$ and then the questioner first switches the movable contact $\alpha$ and $\beta$ to the terminals $t_1$ and $t_4$ and then to the terminals $t_3$ and $t_2$ respectively, whereby the questioner may detect whether the responses of respective questionees are "YES" or "NO."

When one questionee wants to give "no answer," he may switch the switch $c$ to a neutral position so that his lamp will not be turned on whether the questioner switches his movable contacts $\alpha$ and $\beta$ to the terminals $t_1$ and $t_4$; or $t_3$ and $t_2$.

Figure 2A:
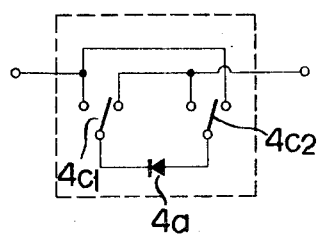
FIG. 2a is a modification of FIG. 2.

So far the lamps $L_{21}$, $L_{22}$, $L_{23}$,...have been described as indicating the response or answer of the questionees, but they may be replaced with other indicating means including recording means or combined indicating-recording means, as shown in FIG. 2a. In this view, a lamp $L_{21}$ (corresponding to $L_{21}$ of FIG. 2) is shown in dashed lines, and a conventional recorder Rec, also in dashed lines, is shown connected across it in the form of a box. By the dashed outlines and connections it is intended to denote an optional arrangement whereby one may use the lamps alone, or the recorders alone, or combinations of both. It will be understood that the optional arrangement of FIG. 2a may apply to all modifications of the invention. Therefore, it is possible to record and accumulate the answers by the device of the present invention.

Figures 3, 4:
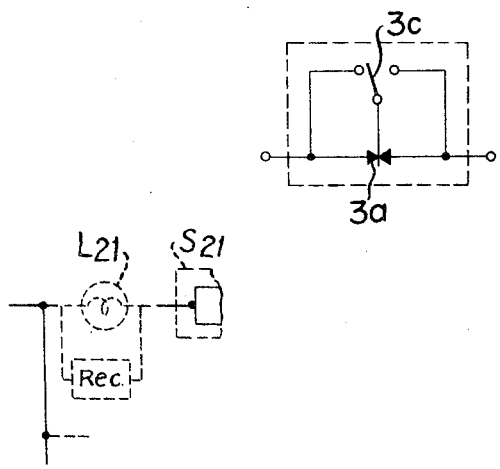
FIGS. 3 and 4 are circuits of other embodiments of questionee's answer selection switches according to the present invention.

FIG. 3 shows a response switch comprised of a pair of symmetrical rectifier elements $3a$ and a switch or movable contact $3c$ for changing over the polarity. FIG. 4 shows still another response switch according to the present invention comprising a rectifier element $4a$ and a pair of switches or movable contacts $4c1$ and $4c2$.

It is to be understood that the response switch of the present invention is not limited only to the above described embodiments, but includes a method and means having one or a pair of rectifier elements and one or a pair of switches or movable contacts for reversing the polarity of the response switch.

Figure 5:
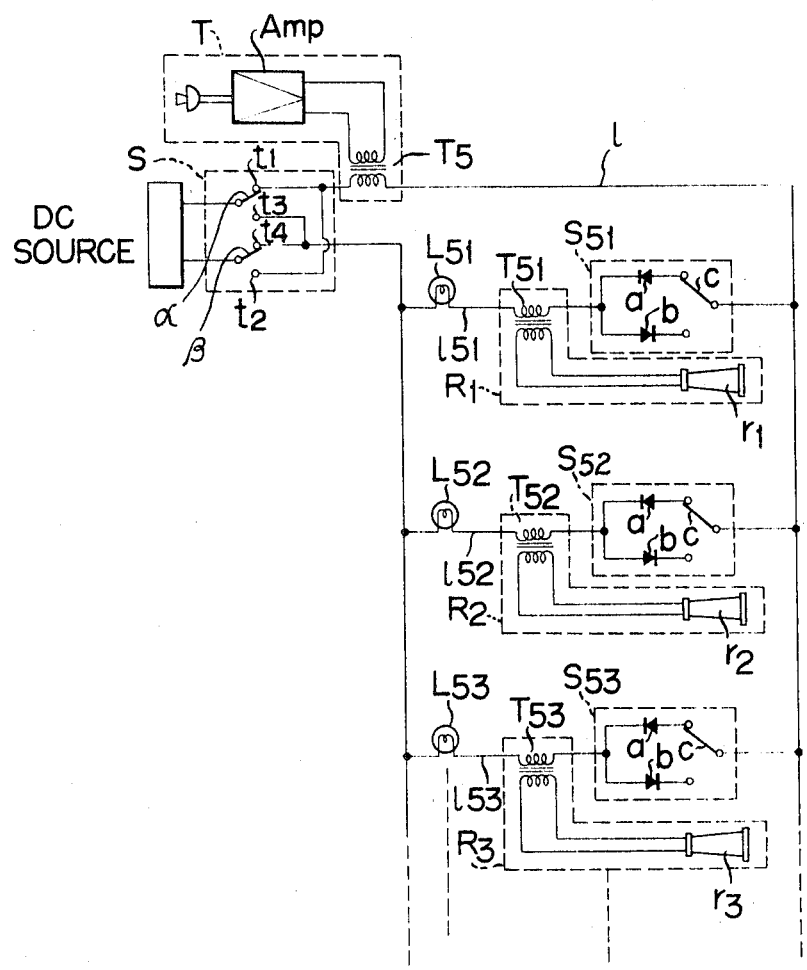
FIG. 5 is a circuit showing a further embodiment of the present invention.

FIG. 5 shows a circuit diagram of one embodiment in which a response-detecting circuit is combined with an audio communication system, the response-detecting circuit being similar to the shown in FIG. 2.

In the response switch circuits in which the lamps are turned on, their receivers ($R_1$, $R_2$, $R_3$,...containing receivers $r_1$, $r_2$, $r_3$,...) receive the audio signals from the transmitter T through an amplifier Amp, a transformer $T_s$, a common transmission line $l$ and respective transformers $T_{s1}$, $T_{s2}$, $T_{s3}$,...so that the questionees who have turned on their lamps $L_{s1}$, $L_{s2}$, $L_{s3}$,...can hear the instruction or the like from the questioner.

I claim:

1. A questionee's response-detecting device for YES, NO and NO RESPONSE answers including a main circuit comprising:

a DC power source;

a questioner's changeover switch means having a plurality of selectable pairs of terminals therein;

a first pair of leads connected to a first pair of said terminals and connecting said DC power source in series with said questioner's switch means, said leads having current flowing therein in a predetermined direction when said main circuit is energized;

questionee answer selection circuit means;

a second pair of lead connected respectively to second and third pairs of said terminals and connecting said questioner's switch means in series with said questionee circuit means to complete said main circuit whereby current selectively flows in either one or the opposite direction through said second pair of leads and said questionee circuit means;

said questioner's switch means comprising a double throw switch having two elements movable in unison 5, said second or third pairs of terminals, alternatively;

said questionee circuit means comprising a plurality of selection circuits each connected between said second pair of leads and connected in parallel with each other; each selection circuit comprising a series connection of an energizable lamp, an audio receiving means and a selection switch means, said selection switch means comprising a pair of rectifiers connected in parallel with each other and each adapted to pass current in an opposite direction with respect to each other, each said rectifier connected to a contact, and a switch element being selectively movable to one of said contacts to allow current to pass through one of said rectifiers in its respective direction; and audio-transmitting means connected to one of said second pair of leads and transformer coupled to said audio-receiving means to send a signal thereto when the main circuit is energized;

said double-throw switch selectively positioned at one of said second and third pairs of terminals to determine the current flow in one of the directions through said second pair of leads and questionee switch means, said current flow provided in said main circuit by selectively positioning said questionee switch element at one of said contacts to allow current to flow through one of said rectifiers in the same one direction thereby indicating one of the YES and NO answers and simultaneously energizing said lamp and said audio-receiving means, and said questionee switch element selectively positionable between said contacts to prevent current flow in the main circuit whereby the lamp is deenergized indicating a NO RESPONSE answer.

UNITED STATES PATENT OFFICE
CERTIFICATE OF CORRECTION

Patent No. 3594927  Dated July 27, 1971

Inventor(s) Masami Koizumi

It is certified that error appears in the above-identified patent and that said Letters Patent are hereby corrected as shown below:

Column 1, line 42,     correct the spelling of "questionee's";

Column 4, line 8,      correct the spelling of "leads";

Column 4, line 16,     delete "5," and insert -- and selectively connecting said first pair of terminals with --.

Signed and sealed this 8th day of February 1972.

(SEAL)
Attest:

EDWARD M.FLETCHER,JR.          ROBERT GOTTSCHALK
Attesting Officer              Commissioner of Patents